Nov. 18, 1930.                B. S. BURRELL                1,782,337
                    MEANS FOR LUBRICATING CONNECTERS
                       Filed April 14, 1928            2 Sheets-Sheet 1
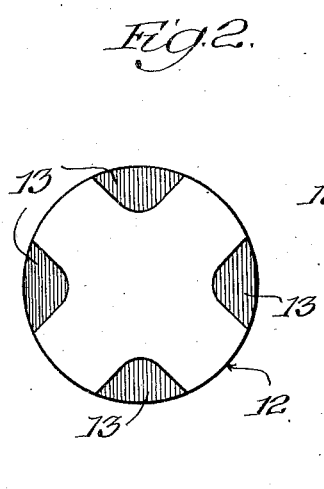
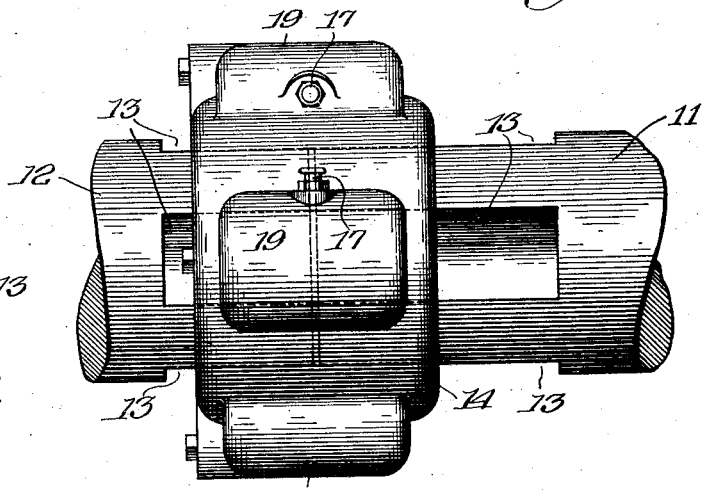
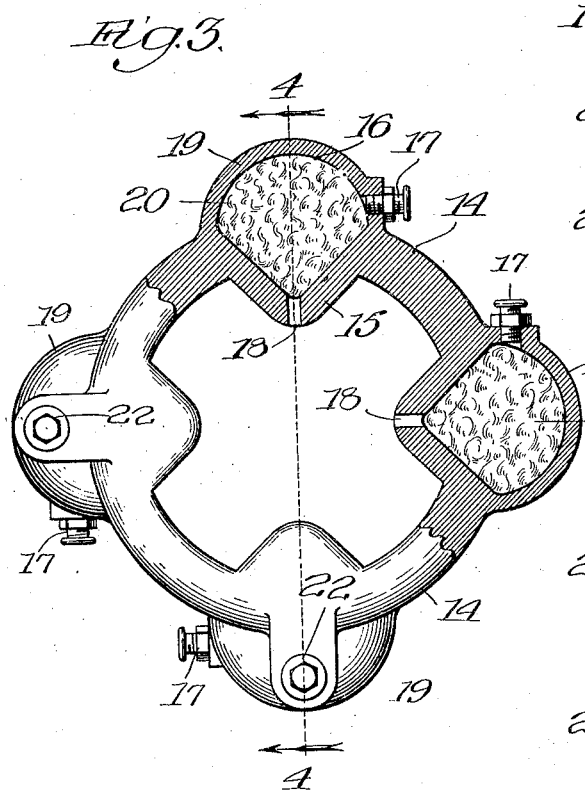
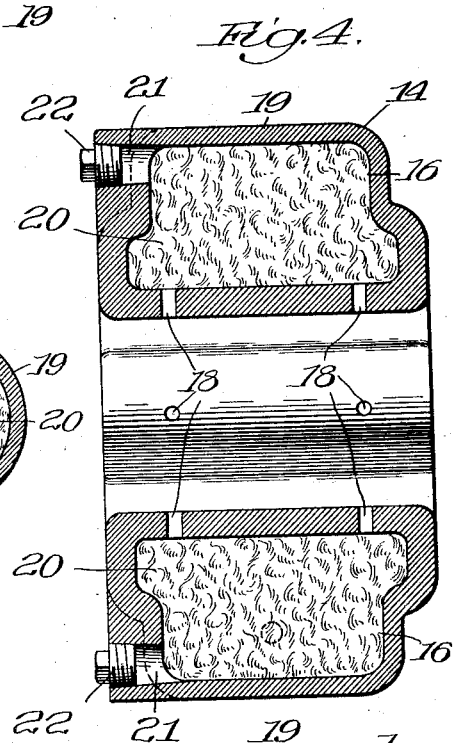
Inventor:
Benjamin S. Burrell,
By Dyrenforth, Lee, Chritton & Wiles
Attys.

Nov. 18, 1930.  B. S. BURRELL  1,782,337
MEANS FOR LUBRICATING CONNECTERS
Filed April 14, 1928  2 Sheets-Sheet 2
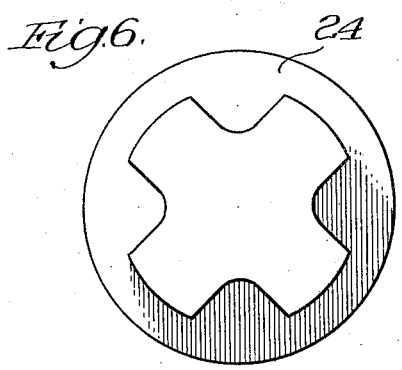
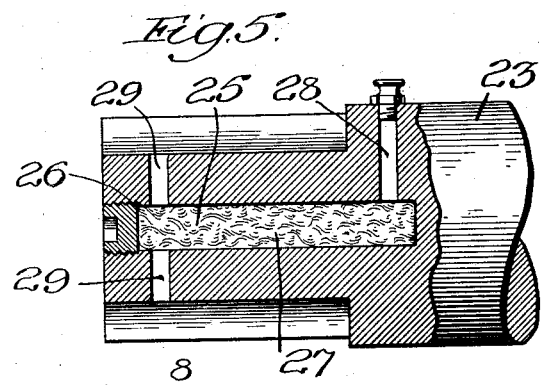
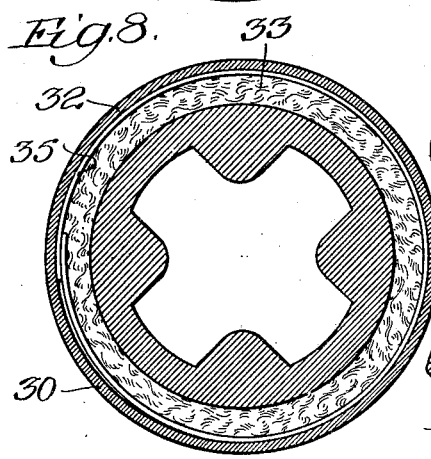
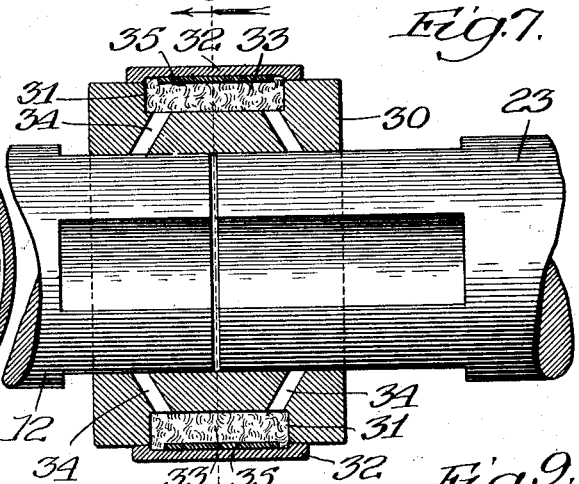
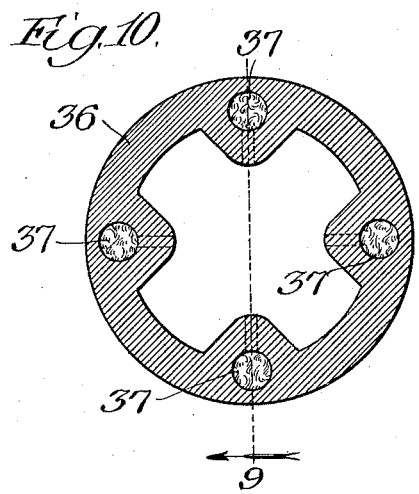
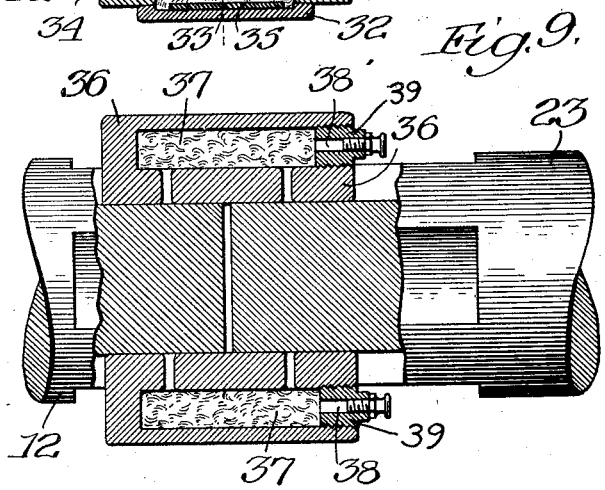

Patented Nov. 18, 1930

1,782,337

UNITED STATES PATENT OFFICE

BENJAMIN S. BURRELL, OF EAST CHICAGO, INDIANA

MEANS FOR LUBRICATING CONNECTERS

Application filed April 14, 1928. Serial No. 270,070.

My invention relates, more particularly, to the lubricating of the connections between drive and driven rotary members, such as, for example, and more particularly, the loose and wobbling connections commonly employed in relatively heavy machines, as for example, between drive-spindles and the rolls of rolling mills, which are driven at relatively slow speed.

Such connections are subject to very rapid wear, with consequent impairment, unless properly lubricated, due to the great rubbing action which occurs in use between the opposing surfaces of the connecting means.

It is the practice, in the operation of machines having connecters of the kind above described, to lubricate such connecters by the periodic pouring of oil upon them by a workman, but such practice presents many objections, among which are great waste of oil, a small portion only of the oil poured onto the connecters reaching the surfaces to be lubricated; large expense for labor, particularly if the connecters are oiled sufficiently frequently to ensure against the wearing surfaces becoming dry; and inadequate lubrication which results in objectionably great wear, requiring frequent replacements which are not only costly, but require that the machine be out of commission while being made.

My object is to provide for the adequate lubrication of such connecters to the end of greatly prolonging their life; to provide for such lubrication without waste of lubricant and at a relatively low cost for labor; and other objects, as will be manifest from the following description.

Referring to the accompanying drawings:

Figure 1 is a view in side elevation of the adjacent ends of a drive-spindle of a rolling mill and a roll to be driven thereby, together with a coupling box connecting together the spindle and roll for drive of the latter from the spindle, the structure being provided with lubricating means constituting one of the embodiments of my invention.

Figure 2 is an end elevational view showing the form of the adjacent, opposed ends of the spindle and roll.

Figure 3 is an end view of the coupling-box of Figure 1, with certain portions broken away and sectioned to disclose the lubricating means.

Figure 4 is a section taken at the line 4—4 on Fig. 3 and viewed in the direction of the arrows.

Figure 5 is a side view of the coupler-end of a rotary member to be coupled to another rotary member by a loose connection, and lubricated in accordance with another embodiment of my invention.

Figure 6 is an end view of a coupling-box for the member of Fig. 5.

Figure 7 is a view in side elevation of the adjacent ends of a drive-spidle of a rolling mill and a roll to be driven thereby, together with a coupling-box therefor, shown in section and provided with lubricating means constituting still another embodiment of my invention.

Figure 8 is a sectional view of the coupling box of Fig. 7 with the spring band in elevation, the section being taken at the line 8 on Fig. 7 and viewed in the direction of the arrow.

Figure 9 is a view like Fig. 7 of a drive-spindle, roll and coupling-box therefor with lubricating means therefor, constituting still another embodiment of my invention, the box and portions of the other parts being shown in section; and Figure 10, a cross-sectional view of the coupling-box.

Referring to the construction shown in Figs. 1, 2, 3 and 4, an end of the rotary spindle, as for example, of a rolling mill, is shown at 11, and the adjacent end of a roll, as for example, of such a mill and substantially axially aligned with the spindle, is shown at 12, these ends of the spindle and roll being preferably longitudinally grooved at intervals about their periphery, as represented at 13.

The coupling of the spindle 11 and roll 12 for drive of the latter from the spindle is by means of a coupling box 14, open at its opposite ends, at which it extends loosely over the opposing ends of the spindle and roll, the inner wall of the box containing longitudinally-extending, inwardly-projecting ribs 15 which loosely extend into the grooves 13 in the spindle and roll, thereby providing a loose or wobbling, drive-connection between these parts.

In accordance with this embodiment of my invention, the coupling box 14 is provided with a peripheral series of lubricant-receiving chambers 16 provided with lubricant-inlets 17, preferably provided with inwardly-opening check-valves (not shown), and also with outlets 18 opening through the apexes of the ribs 15, radially of the axis of the box 14, into the interior of the box for the passage of lubricant into the joints between the box and the spindle and roll to lubricate the mutually-contacting surfaces of these parts.

The box 14 is of bulging form at its outer surface at points radially aligned with the ribs 15, as represented at 19, and into which the chambers 16 extend, as shown, thereby affording relatively large chambers with the minimum of metal.

The chambers 16 are preferably charged with grease-absorbing material 20, such as, for example, wool yarn, introduced into the chambers 16 through openings 21 therein, equipped with removable screw-plugs 22, the lubricant, preferably in the form of grease, being charged into the chambers 16 through the inlets 17, and becoming disseminated throughout the masses 20 of material.

In structures of the character described, the spindles, rolls and coupling boxes are rotated comparatively slowly, thus exerting but slight tendency to centrifugal action upon the grease, and in rotating, considerable jarring of these parts occurs which operates to cause the grease to feed through the outlets of the chambers 16, producing and maintaining the desired film of grease between the opposed surfaces of the spindle, roll and coupling box.

In the construction shown in Fig. 5, the lubricant instead of being contained in a chamber in the coupling box, is provided either in the end of the spindle or roll, or both, as shown of the spindle represented at 23, the coupling box 24 of Fig. 6, of the same internal form as the box of the preceding figures, being provided for interlock with the adjacent ends of the spindle and roll, as in the previously-described construction.

The lubricant-chamber of Fig. 5 is shown at 25, it being charged through its plug-equipped opening 26, with material 27 corresponding with the material in the chambers 16, the chamber 25 having a filler-opening 28 equipped with an inwardly-opening check-valve (not shown) and outlets 29 extending radially outwardly through the longitudinally ribbed outer surface of the connecting end of the spindle, preferably through the bottoms of each valley portion thereof as shown of the outlets illustrated, for leading the lubricant to the surfaces to be lubricated.

In the arrangement shown in Figs. 7 and 8, the coupling box represented at 30 and having interlocking driving engagement with the spindle and roll, as shown and explained of the construction shown in Figs. 1, 2, 3 and 4, instead of being provided with a peripheral series of chambers, contains a single peripheral lubricant-chamber 31 shown as closed by a band 32 secured to the body of the coupling box in any suitable way.

The chamber thus provided is filled, through a filler opening (not shown), with material 33 such as the material 20, this chamber also having a lubricant-filling opening (not shown), as in the case of the previously-described constructions.

In this construction, the use of a spring follower member is illustrated for aiding in the forcing of the grease from the chamber through its outlets 34 to the joints between the spindle, roll and coupling box. This spring follower is shown as in the form of a spring strip 35 coiled upon itself, as shown and located at the inner surface of the enclosing band 32, the strip 35 being so tensioned that it tends to contract and thus exerts a continuing force on the grease, urging it toward the outlets 34.

The construction shown in Figs. 9 and 10 is the same as that shown in Fig. 1, except for the external shape of the peripheral portion of the coupling box which, represented at 36, instead of presenting its lubricant chambers partly beyond the outer surface of the main portion of the box, has its chambers, represented at 37, wholly within the symmetrical periphery of the box as shown, the valve-equipped grease-inlets 38 being in plugs 39 at ends of the chambers 37, in alignment with the longitudinal axes of the latter, the plugs, when removed, permitting these chambers to be charged with material like the material 20.

It will be understood from the foregoing that by incorporating my invention in the driving-connection between rotary members, efficient and continuing lubrication of the contacting surfaces at the connection between these parts is effected and without requiring frequent replenishment of the lubricant, thereby greatly minimizing wear and impairment of the structure.

While I have illustrated and described certain embodiments of my invention, I do not wish to be understood as intending to limit it thereto or to use in a machine of the character stated, as it may be provided in other forms and for use in other kinds of machines without departing from the spirit of my invention.

What I claim as new, and desire to secure by Letters Patent, is:

1. A wobbling coupler construction comprising a rotatable drive member, a rotatable member to be driven thereby, and a rotatable coupler member encircling at its ends the ends of the others of said members and having inwardly extending projections at which said coupler member has wobbling driving connection with each of said first and second-named members, said coupler member containing a lubricant chamber in radial alinement with one of said projections and opening into the joints between said coupler member and said first and second-named members for supplying lubricant to the driving and driven surfaces of said members.

2. A wobbling coupler construction comprising a rotatable drive member, a rotatable member to be driven thereby, and a rotatable coupler member encircling at its ends the ends of the others of said members and having inwardly extending projections at which said coupler member has wobbling driving connection with each of said first and second-named members, said coupler member containing a lubricant chamber in radial alinement with, and extending into, one of said projections and opening into the joints between said coupler member and said first and second-named members for supplying lubricant to the driving and driven surfaces of said members.

BENJAMIN S. BURRELL.